Nov. 22, 1955     ALI UMIT KUTSAY     2,724,265
FLEXURE TESTING FIXTURE
Filed March 11, 1953
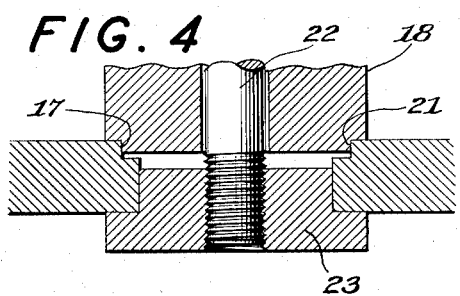
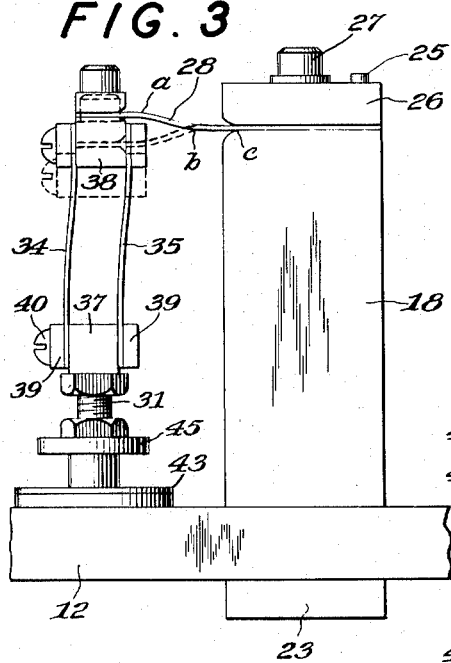
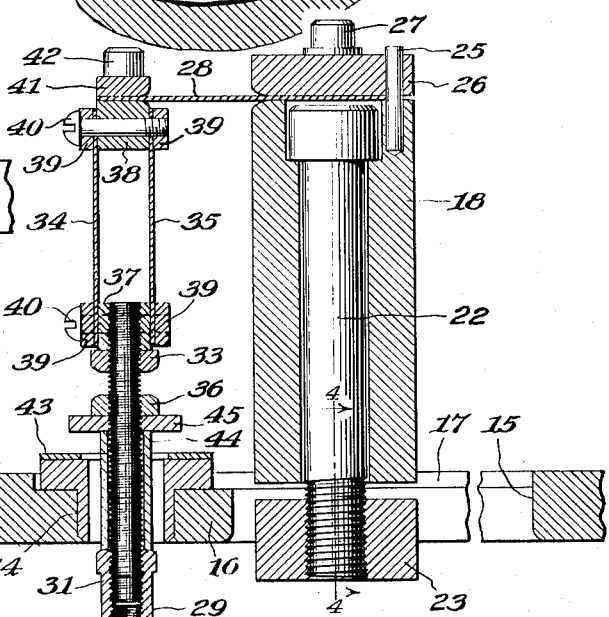
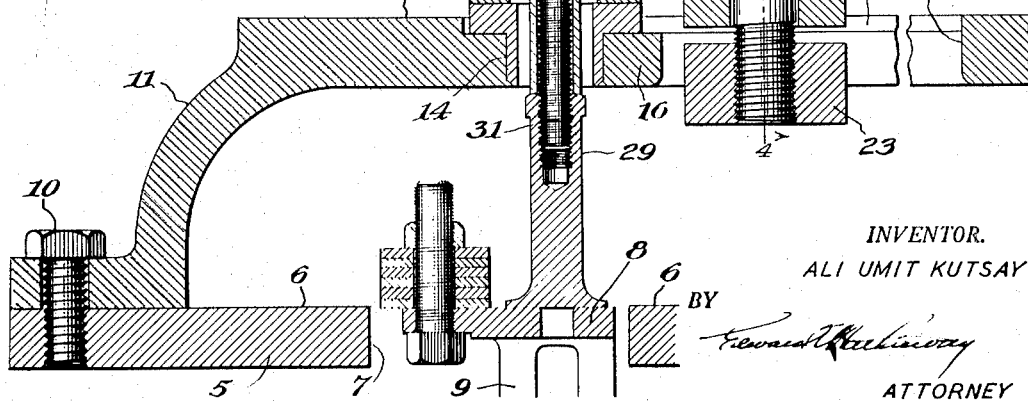
INVENTOR.
ALI UMIT KUTSAY great # United States Patent Office 2,724,265
Patented Nov. 22, 1955

2,724,265

FLEXURE TESTING FIXTURE

Ali Umit Kutsay, Greenwich, Conn., assignor to Baldwin-Lima-Hamilton Corporation, a corporation of Pennsylvania Application March 11, 1953, Serial No. 341,784

8 Claims. (Cl. 73—100)

This invention relates generally to fatigue testing machines of the reciprocating or vibratory force type, and more particularly to a bending fixture for use therewith in flexure-testing specimens, particularly relatively thin flat specimens.

Heretofore flexure testing machines have been proposed and used for testing a simple cantilever beam fixed at one end and reciprocally or dynamically loaded at its other end which has been entirely free so that the entire length of the specimen assumes a natural curvature of a single bend. This method of testing has been satisfactory for specimens exceeding a certain minimum thickness. However, for very thin specimens the deflections necessary to produce sufficiently high fatigue stresses reach proportions which defy simple and practical solutions of applying the reciprocating force without introducing undesirable extraneous forces.

An object of my invention is to provide an improved bending fixture that will effectively subject thin specimens to fatigue stresses with a relatively small deflection of the specimen.

Another object is to provide an improved bending fixture that will effectively subject thin specimens to fatgue stresses with a relatively small deflection and without introducing undue longitudinal or axial stress in the specimen.

A further object is to provide such a bending fixture that is simple and inexpensive in construction, operation and maintenance, and that can be readily removed from the testing machine for replacement by fixtures of other types.

In accomplishing the foregoing and other objects of the invention, such as will be apparent to those skilled in the art, a relatively thin flat specimen is used which is fixed at one end while the other end is longitudinally free but restrained or guided so as to subject the specimen to a double curvature of bend during each direction of reciprocatory movement. The deflection of this outer end necessary to produce the desired fatigue stressing is substantially reduced over the deflection that has heretofore been necessary for testing simple cantilever beams. In accomplishing this the loaded end of the specimen is guided in a manner which permits the application of bending stresses only while keeping longitudinal stresses to a minimum.

Other objects and advantages will be more apparent to those skilled in the art from the following description of the accompanying drawings in which:

Fig. 1 is a perspective of my improved bending fixture showing a specimen of thin material in position for flexure-testing;

Fig. 2 is a vertical section of one half of the upper frame and table of a reciprocating or vibratory force type of fatigue testing machine, such as that illustrated and described in Lazan Patent No. 2,486,567, and showing my improved bending fixture applied thereto with the specimen and flex plates in neutral or unstressed position;

Fig. 3 is an elevation of the bending fixture showing a specimen under stress; and Fig. 4 is a sectional view taken along the line 4—4 of Fig. 2 in the direction of the arrows.

The particular embodiment of the invention disclosed herein is shown, for purposes of illustration, in connection with the machine of said Lazan patent whose details of construction are considered part hereof. In Figs. 1 to 3 a normally stationary, but seismic, frame 5 has a top surface 6 provided with a suitable opening 7 in which a vertically reciprocating table 8 is attached to a vibratory frame 9 of a fatigue testing machine such as described in said patent. To top surface 6, I secure by bolts 10 a bending fixture frame 11 having a raised platform 12 in which are formed round and rectangular openings 14 and 15 separated by a dividing wall 16. A corner groove 17 is formed around the upper edges of said openings. A vertical stationary specimen support 18 is reduced at its lower end at 21, Fig. 4, to fit slidingly between the straight parallel sides of groove 17 and is clamped to platform 12 by a threaded bolt 22 and a flanged nut 23 engaging the lower edges of opening 15.

A relatively thin flat specimen 28, preferably with its width gradually reduced from each end to a narrow neck at the center, is clamped at one end to support 18 by screws 27 and a bar 26 which has an aligning dowel pin 25. The other end of the specimen is clamped so as to be vertically reciprocated by a mechanism including a threaded socket 29 rigidly clamped to vibrating frame 9, and a rod 31 threadedly connected both to the socket and to a lower head 37 to which a pair of parallel flex plates 34 and 35 are clamped by bars 39 and screws 40. The upper ends of the plates are similarly clamped to a head 38 and the specimen is clamped thereto by a bar 41 and screws 42 threaded in the head. Jam nuts 33 and 36 and a spaced sleeve 44 prevent relative rotation between the various threaded members while a washer 45 and a flanged buffer 43 serve as a downward limit stop when the specimen fails.

It is to be understood that the parts of the bending fixture are so proportioned and arranged that when reciprocating frame 9 is at its mid point, between its extreme positions as shown in Fig. 2, specimen 28 and flex plates 34 and 35 are in a neutral or unstressed position. The extreme positions of head 38 and specimen 28 are shown in dotted and full lines in Fig. 3. By employing parallel elements, preferably in the nature of flex plates 34 and 35, whose upper ends are laterally movable, the reciprocating movement of table 8 is transmitted to the reciprocating end of specimen 28 to subject it substantially only to flexure strains without any adverse extrinsic longitudinal stresses or strains that would affect the flexure test. The table 8 and frame 9 constitute means for relatively reciprocating the specimen holding means 18 and 38 in a direction transverse to the specimen axis.

*Operation.*—When specimen 28 has been properly clamped by bars 26 and 41 the table 8 is then vertically reciprocated in a manner particularly described in said patent to cause rod 31 and the flex plate assembly to move up and down and to prevent the reciprocating end of the specimen from rotating about a transverse axis. That is, the angle of this end of the specimen remains constant with respect to any given plane such as the horizontal. This causes two points, $a$ and $b$, Fig. 3, on the length of specimen 28 to be flexed simultaneously but alternately in opposite directions thus producing a stress at these points with a deflection that is very substantially less than the deflection that would be required for producing the same stress in a simple beam. Each time rod 31 moves through its mid point betwen its extreme positions on either an up or down stroke, flex plates 34 and 35 and specimen 28 become momentarily neutral or unstressed, but when rod 31 moves to either of its extreme positions, not only is the specimen flexed at points $a$ and $b$, as described above, but also the upper ends of flex plates 34 and 35 are pulled slightly towards support 18 by the specimen, as shown in Fig. 3. This deflection is due, of course, to the fact that the reciprocating end of the specimen moves upwardly and downwardly in an arc of which point $c$ is the center. The corners of the clamping elements are preferably slightly rounded. Since the flex plates are identically formed and parallel the upper end of the flex plate assembly guides head 38 so that it is maintained at a predetermined angularity at all times relative to a common plane throughout reciprocation of the head and despite its lateral movement that is allowed by the flex plates 34, 35 which would not be the case if there were but a single flexible member here. Specifically the head is kept level to a horizontal plane. The result is that the specimen in each cycle of operation receives its maximum stress at both points $a$ and $b$.

To alter the distance between specimen support 18 and the flex plate assembly, clamping bar 26 and specimen 28 are moved to one side and bolt 22 loosened from stationary nut 23. When the support and nut have been moved along groove 17 to the desired position, bolt 22 is retightened in nut 23.

It is seen from the foregoing description that I have provided a simple, inexpensive and yet highly effective bending fixture for use with fatigue testing machines having a reciprocating or vibratory force of limited amplitude when flexure-testing relatively thin specimens and structures.

It will, of course, be understood that various changes in details of construction and arrangement of parts may be made by those skilled in the art without departing from the spirit of the invention as set forth in the appended claims.

I claim:

1. A flexure testing apparatus comprising, in combination, a pair of means for respectively holding the opposite ends of a specimen, means for relatively reciprocating the respective holding means in a direction transverse to the specimen axis, and means for maintaining said opposite ends of the specimen in parallelism for producing flexure simultaneously in opposite directions in the specimen during each reciprocation of the holding means.

2. A flexure testing apparatus comprising, in combination, a pair of means for respectively holding the opposite ends of a specimen, means for relatively reciprocating the respective holding means in a direction transverse to the specimen axis, and means for maintaining the opposite ends of the specimen in parallel planes during reciprocation so as to produce in the specimen simultaneous flexure in opposite directions.

3. The combination set forth in claim 2 further characterized in that the means for maintaining the parallelism of the holding means includes a pair of parallel laterally flexible elements spaced apart in a direction lengthwise of the specimen and connecting the reciprocating means to one of the holding means so that the parallel elements are movable generally in the direction of reciprocation as well as laterally during flexure of the specimen, thereby to maintain said parallelism constant.

4. A flexure testing apparatus comprising, in combination, a pair of means for respectively holding the opposite ends of a specimen, means for relatively reciprocating the respective holding means in a direction transverse to the specimen axis, and means for maintaining the opposite ends of a specimen in parallelism during reciprocation so as to produce in the specimen simultaneous flexure in opposite directions, said means for maintaining the parallelism including laterally movable parallel elements for allowing relative movement of the two holding means towards each other during specimen flexure.

5. A fatigue testing apparatus comprising, in combination, a support for holding fixed one end of a laterally extended specimen to be flexure-tested, a reciprocating element movable along a line disposed at right angles to the laterally extending axis of the specimen, laterally movable means connecting the second end of the specimen to said reciprocating element thereby to transmit movement of the reciprocating element to the specimen and means for guiding said second end to prevent it from rotating amout a transverse axis but allowing said connecting means to be movable laterally to accommodate itself to the shortening of the lateral distance between said support and the line of movement of the reciprocating element arising from flexure of the specimen, thereby to flex the specimen simultaneously in opposite directions.

6. The combination, as defined in claim 2, further characterized in that the laterally movable means comprises laterally flexible means secured at one end to the reciprocating element and at the other end to the specimen.

7. The combination, as defined in claim 2, further characterized in that the laterally movable means comprises laterally flexible substantially parallel plates.

8. The combination set forth in claim 2 further characterized in that the laterally movable means for maintaining the parallelism includes parallel flexible plates for allowing relative movement of the two holding means towards each other during specimen flexure, and heads to which each end of the flexible plates are rigidly secured in laterally spaced relation to each other.

References Cited in the file of this patent

UNITED STATES PATENTS

| 1,512,063 | Sproull | Oct. 21, 1924 |
| 1,608,174 | Heymann | Nov. 23, 1926 |
| 2,448,133 | Yorgiadis | Aug. 31, 1948 |
| 2,453,023 | L'Hermite | Nov. 2, 1948 |

FOREIGN PATENTS

| 493,268 | Great Britain | Oct. 5, 1938 |
| 512,035 | Great Britain | Aug. 28, 1939 |